United States Patent [19]

Gücklhorn et al.

[11] Patent Number: 4,532,693
[45] Date of Patent: Aug. 6, 1985

[54] TOOL EXCHANGING APPARATUS FOR A MACHINE TOOL HAVING A PLURALITY OF PROCESSING SPINDLES

[75] Inventors: Karl Gücklhorn; Wolfgang Carl, both of Aalen, Fed. Rep. of Germany

[73] Assignee: Alfing Kessler Sondermaschinen GmbH, Aalen-Wassezalfingen, Fed. Rep. of Germany

[21] Appl. No.: 512,954

[22] Filed: Jul. 12, 1983

[30] Foreign Application Priority Data

Jan. 17, 1983 [DE] Fed. Rep. of Germany ....... 3301334

[51] Int. Cl.³ .............................................. B23Q 3/157
[52] U.S. Cl. ..................................... 29/568; 29/26 A
[58] Field of Search ................ 29/568, 26 A; 279/79, 279/76; 409/232, 234

[56] References Cited

U.S. PATENT DOCUMENTS

| 3,568,849 | 3/1971 | Hutchison ............... 29/568 |
| 3,604,083 | 9/1971 | Antonietto et al. ........... 29/568 X |
| 4,204,303 | 5/1980 | Eidam ............... 29/568 X |
| 4,204,304 | 5/1980 | Eidam ............... 29/568 X |
| 4,356,621 | 11/1982 | Tomita et al. ............... 29/568 |

FOREIGN PATENT DOCUMENTS

| 53646 | 6/1982 | European Pat. Off. ............. 29/568 |
| 1920275 | 2/1970 | Fed. Rep. of Germany ........ 29/568 |
| 2496532 | 6/1982 | France ............................... 29/568 |
| 137676 | 9/1979 | German Democratic Rep. ... 29/568 |
| 197705 | 5/1977 | U.S.S.R. ............................. 29/568 |
| 948607 | 8/1982 | U.S.S.R. ............................. 29/568 |

Primary Examiner—William R. Briggs
Attorney, Agent, or Firm—Brooks Haidt Haffner & Delahunty

[57] ABSTRACT

Tool exchanging apparatus for a machine tool having a plurality of processing spindles which have quick-change adapters for the tool holders which are insertable in a tool carrier, so that with a simple mechanical design the cost of the automatic coupling on the processing spindles is reduced. The tool holders charged with the tools should be slidable through apertures of the tool carrier in the exchange direction and at least in their decoupling or coupling positions should be held in the apertures so that a movement contrary to the exchange direction is prevented, and at least for the tool holders carrying the new tools, the carrier lugs thereof should be retractable over a limited path contrary to the exchange direction and against the force of a spring, a device being provided for preventing rotation of the tool holder.

25 Claims, 5 Drawing Figures

TOOL EXCHANGING APPARATUS FOR A MACHINE TOOL HAVING A PLURALITY OF PROCESSING SPINDLES

The present invention refers to tool exchanging apparatus for a machine tool with a number of processing spindles, which have quick-change adapters for tool holders.

In the known tool exchanging devices of this type (cf. German Offenlegungsschrift No. 19 20 275) there is a problem in that correct automatic coupling by means of the quick-change adapters of the tool holder bearing the new tools onto the processing spindles is only possible when engagement lugs of the tool holder come to rest exactly in the corresponding recesses in the quick-change adapters (cf. col. 6 lines 7-14 of the German Offenlegungsschrift). This presupposes that firstly the tool holders charged with the new tools are inserted exactly at the correct angle in the apertures of the tool carrier, and secondly that the processing spindles with the quick-change adapters are stopped in a position exactly coordinated with this angle. The stopping of the processing spindles in a precisely predetermined position however requires, in the case of machine tools, a substantial expenditure for the design and control of the drive of the processing spindles (cf. col. 6, lines 30-36 of the German Offenlegunsschrift).

A further problem is caused by the fact that, with such known tool exchanging devices, the design of a tool carrier is relatively complicated. Thus the tool carrier consists of an elongate rotatable support frame mounted on both sides, which is provided with a plurality of offset charging boxes which form the apertures for the tool holder. The charging boxes are provided with respective spring-loaded grab jaws mounted on pivots for fixing the tool holder, which involves a relatively costly overall mechanical design.

An object of the present invention is to further develop a tool exchanging device of the type named above so that with simple mechanical construction, the cost of the automatic coupling of the tool holders onto the processing spindles is reduced.

According to the present invention, there is provided tool exchanging apparatus for a machine tool having a processing spindle, which has a quick-change adapter for receiving a tool holder, comprising: a tool holder; a tool carrier having an aperture for the receipt of the tool holder, said tool carrier being movable from a tool charging position into a tool exchange position; means for moving the tool holder through the aperture of the tool carrier in a first direction; means for holding the tool holder, at least in its decoupling or coupling position, in said aperture in a manner such that movement in a second direction opposite to the first direction is blocked; at least one engagement lug which can be retracted by a limited distance relative to the tool carrier in said second direction against a baissing means; and means for preventing rotary movement of said tool holder in said aperture of the tool carrier when the engagement lug is retracted.

According to the invention, for the first time a tool exchanging device has been created with which, without the use of special control and regulation means for the drive of the processing spindles, a substantially completely reliable coupling of the tool holders, bearing the new tools, to the processing spindles is achieved.

Thus the invention is based on the recognition that very costly exact stopping of the processing spindles in a predetermined position can be avoided when measures are taken which make it possible that the tool holders charged with the new tools can be accepted by the processing spindles while rotating. Since the drivers of the processing spindles usually have gear stages in which the processing spindles rotate at low rpm, the arrangement according to the invention makes use of this fact as follows:

Firstly by means of the tool carrier the tool holders charged with the new tools are inserted with the shaft in the rotating quick-change adapters until the engagement lugs meet the corresponding parts of the quick-change adapters and abut them. Due to the fact that the engagement lugs can be retracted a limited distance relative to the tool carrier in a direction opposite to the exchange direction and against the force of a spring, the tool carrier is then moved a certain distance in the direction of the processing spindles so that the engagement lugs, under the influence of the spring, slide along the corresponding parts of the quick-change adapter until they fit into the corresponding recesses in the quick-change adapters and because of the form-locked coupling caused thereby they are now moved along by the latter. In order to prevent the tool holders from rotating during this process and thereby preventing the form-locked coupling, a device is provided which blocks rotation of the tool holders in the apertures of the tool carrier. But since this blocking effect takes place only in the retracted position of the engagement lugs, the tool holders can again freely rotate in the apertures of the tool carrier as soon as the engagement lugs have latched into the recesses in the quick-change adapters and thus have been moved out of their retracted position which blocks the rotational motion.

Because of the fact that the tool holders are capable of being slid through the apertures of the tool carrier, to complete the tool exchange after the coupling of the tool holders to the processing spindles, the tool carrier needs only to be retracted out of the exchange position and moved into the charging position.

For decoupling the used tools, it is only necessary that the tool carrier with its apertures should be moved over the tool holders charged with the used tools so far that said holders are located just in front of their decoupling position in the apertures. If the quick-change adapters are then detached, which can be done in any desired way, the ejectors come into operation and thrust the tool holders into the decoupling position in the tool carrier. Since in this decoupling position the tool holders in the tool carrier can no longer be slid through in a direction opposite to the exchange direction, for the withdrawal of the tool holders from the processing spindles the tool carrier needs only to be moved from its exchange position into the charging position, in which the tool holders charged with the used tools can then be removed by a simple extraction through the tool carrier.

According to an advantageous development of the invention, the quick-change adapters for the decoupling process can be detached by the tool carrier automatically. To do this it is expedient that on the tool carrier, on th side facing the processing spindles and very close to the apertures for the tool holders charged with the used tools, transfer lugs are arranged, by means of which the actuating sleeves of the quick-change adapters can be thrust back to initiate the ejection process.

Tool exchanging devices of the inventive type are especially suitable for designs such as are described in co-pending application Ser. No. 512,953 filed July 12, 1983, (German patent application No. P 32 42 439.6 of Alfing Kessler Sondermaschinen GmbH). Accordingly, it is expedient that the tool carrier should be designed as a plate and the apertures for the tool holders should be formed as boreholes through said plate, whose axes are substantially perpendicular to the plane of the plate. But in principle the tool carrier can have any other desired form.

The retention, i.e. the fixing of the tool holder in the decoupling or coupling positions in the apertures, as well as the locking of the tool holders against sliding motion in the exchange direction, can be performed in various ways. But due to their simple technical design and reliable modus operandi, notch arrangements are particularly suitable.

A technically simple and reliable notch arrangement expediently comprises at least one holding cam connected resiliently with the tool carrier which engages in an annular groove on the tool holder. To allow on the one hand the sliding in the exchange direction and to block on the other hand sliding against the exchange direction, it is expedient that the resilient holding cam should have a lifting slope on its front side which faces the exchange direction and a locking surface on its rear.

A particularly expedient arrangement is achieved with respect to assembly and maintenance when the resilient holding cam is arranged in an insert which is secured in a recess near the aperture in the tool holder.

The use of the insert both in the apertures for the used tools as well as in the apertures for the new tools is achieved by securing the insert selectively in its associated recess so that the locking surface of the holding cam is either facing or turned away from the processing spindles.

In a preferred embodiment of the tool exchanging device, each tool holder is equipped with a single annular groove, while the holding cams of all the apertures of the tool carrier are in one plane.

But it is also possible that each tool holder should be fitted with two spaced and adjacent annular grooves and that the holding cams of the apertures for the tool holders charged with the new tools are in a first plane, while the holding cams of the apertures for the tool holders charged with the used tools are arranged in a second plane.

In principle, the device for blocking the rotation of the tool holder in the respective aperture can be designed in many different ways. But it is advantageous to provide a clamping device arranged within the shaft of the tool holder, which engages force-locked or form-locked on the tool carrier.

In such an embodiment, it is advantageous that the engagement lugs should be displaceably mounted in the shaft of the tool holder for limited movement in its axial direction against the exchange direction of the tools and that they should be operatively connected with the clamping device.

An especially simple technical design which is safe in operation is attained with such an embodiment when the clamping device comprises a plunger movable back and forth in the axial direction of the shaft and located in said shaft while being connected with the engagement lugs, which plunger acts upon the clamping device by means of an incline, while the clamping device is supported force-locked or form-locked on the inside of the aperture.

In such a design the clamping device consists advantageously of an O-ring countersunk in an annular groove on the outside of the shaft, which O-ring can be pressed by one or more pressure elements connected with the incline on the inner surface of the aperture. In such an embodiment, it is expedient when the incline is formed by a conical head of the plunger. The pressure elements can be designed advantageously as pressure pins.

In a further embodiment of the inventive tool exchanging device, the device for preventing rotation of the tool holder can also consist of a bushing rotatably mounted on the shaft of the tool holder and fixed so as not to rotate relative to the tool carrier, and can be coupled for rotation with the shaft by a notch therein.

In such an embodiment it is expedient that the engagement lugs should be connected firmly with the tool holder, and the bushing for the limited retraction of the engagement lugs should be displaceably mounted for movement against the exchange direction of the shaft against the force of a pressure spring in the axial direction of the shaft. Thus in such an embodiment, in contrast to the previously described embodiment, it is not the engagement lugs alone which are retracted to a limited extent against the exchange direction and against the force of the spring relative to the tool carrier, but the engagement lugs with said tool holders.

In this device for preventing the rotation of the tool holder in the tool carrier, the bushing is advantageously provided with an annular groove on its inner surface as well as with at least one longitudinal groove perpendicular thereto. Here it is advantageous that by the displacement of the bushing, the notch in the shaft for the rotational coupling of the shaft to the bushing can be removed from the annular groove and can be moved into the area of the longitudinal groove.

Now to prevent the bushing, rotatably coupled to the shaft by the notch, from rotating in the aperture during the coupling process, it is advantageous that on the tool holder a resilient peripheral detent should be secured which engages in the recesses on the outside of the bushing.

A particularly simple design results when the bushing for the receipt of the pressure springs surrounding the shaft has a cut-away portion on its inner surface.

In the annular space formed by this cut-away portion in this embodiment, a spring seat can be arranged on whose front face the pressure seat is supported while its other face abuts the tool holder. In such a case the first annular groove is formed by the front surface of the bushing and a collar of the tool holder while the second annular groove is formed by the other surface of the bushing and a collar of the spring seat.

In the embodiments in which the tool carrier is designed as a plate, and the apertures are formed by boreholes through the plate, whose axes extend substantially perpendicularly to the plate major surfaces, it is expedient if the recesses for the inserts bearing the resilient holding cams are formed by a bore or a passage which extends substantially parallel to the borehole through the plate but is arranged so near to it that it opens in its marginal area into the borehole.

For further explanation and better understanding of the invention, two embodiments are described below in more detail with reference to the accompanying drawings, in which.

Figure 1:
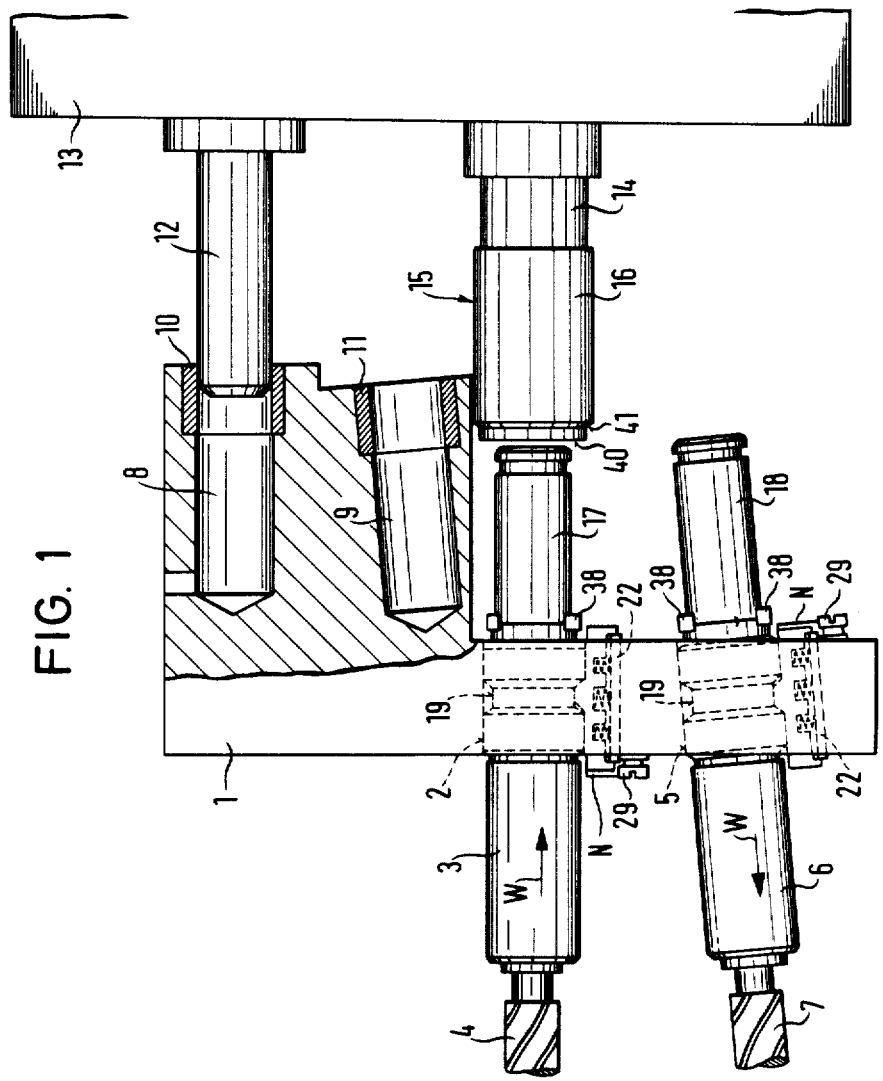
FIG. 1 shows schematically a first embodiment of a tool exchanging device according to the invention, in which for greater clarity only the most important parts are illustrated.
Figure 3:
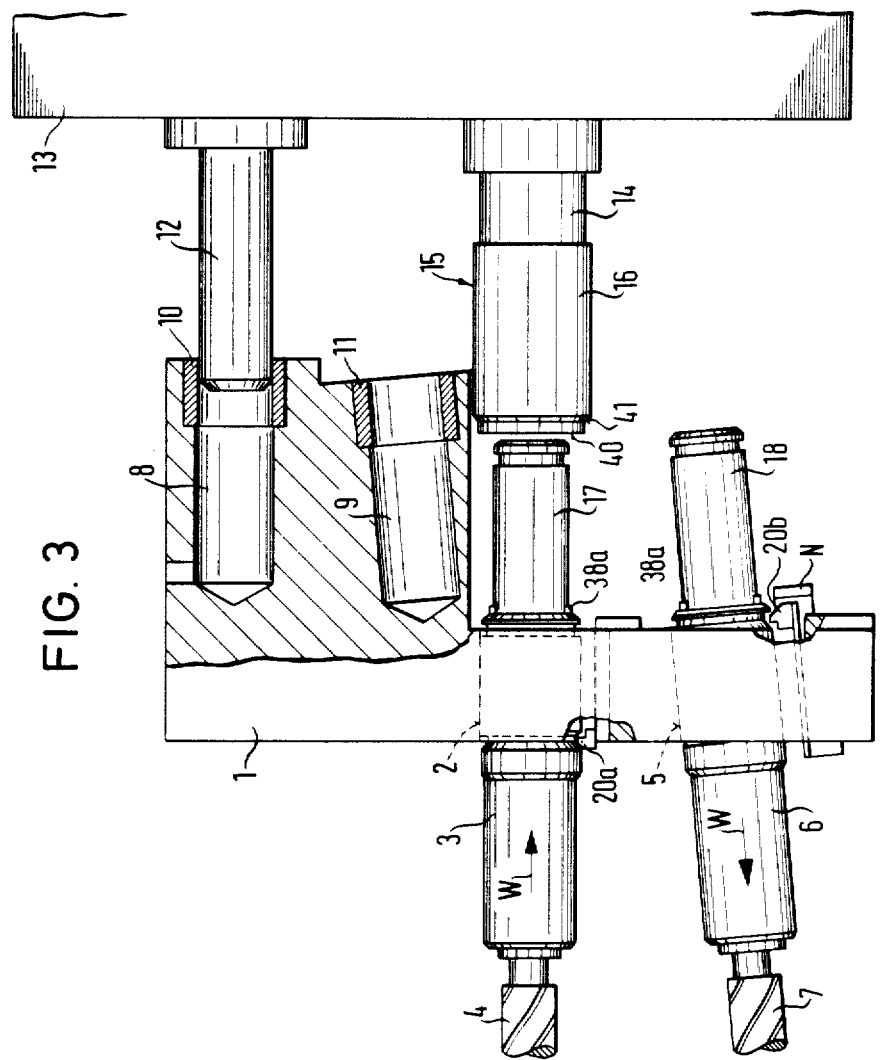
FIG. 3 shows schematically a second embodiment of a tool exchanging device according to the invention in which for greater clarity only the most important parts are shown.

FIGS. 1 and 3 show a tool carrier 1, which is designed generally as a plate, in which in two superimposed rows extending perpendicularly to the plane of the drawing, a plurality of apertures is arranged. In the present embodiment, the upper apertures 2 are to receive the tool holders 3 which are charged with the new tools 4, while the lower apertures 5 are to receive the tool holders 6 charged with the used tools 7.

As can also be seen from FIGS. 1 and 3, the top half of the tool carrier 1 has pocket bores 8 and 9 which are provided at their outlets with respective guide bushings 10 and 11. The guide bushings 10 and 11 interact with a guide rod 12 which is secured on a spindle unit 13, which carries a number of processing spindles 14, which are also arranged perpendicularly to the plane of the drawing one behind another.

The tool carrier 1 is disposed in its exchange position relative to the spindle unit 13. The support of tool carrier 1 as well as its movement from the exchange position to the charging position, including the modus operandi of the guide bushings and guide rods is described in detail in copending patent application Ser. No. 512,953 (German Application No. P 32 42 439.6 of Alfing Kessler Sondermaschinen GmbH). Therefore it should only be noted that the arrangement of the guide bushings 10 and 11 with respect to guide rod 12 is chosen so that when the guide rod 12 rests in the guide bushing 10, the axis of the processing spindle 14 is exactly aligned with the axis of the tool holder 3 for the new tools 4 (cf. FIGS. 1 and 3). When on the other hand the guide rod 12 is at rest in the guide bushing 11, the axis of the processing spindle 14 is exactly aligned with the axis of tool holder 6 with the used tools 7.

The processing spindle 14 carries on its free end a conventional quick-change adapter 15, which is surrounded by an actuating sleeve 16, with which, in the usual way, by axial displacement in the direction of the spindle unit 13 the coupling is released and the ejector located inside the quick-change adapter can take effect.

On its end opposite respective tools 4 and 7, each tool holder 3 or 6 has a shaft 17 or 18, which in the normal way is exactly aligned with the quick-change adapter 15.

According to the invention, the tool holders 3 and 6 can only be slid through respective apertures 2 and 5 in the tool carrier 1 in one direction, the so-called exchange direction. This is indicated in all the Figures by the arrow W.

Figure 2:
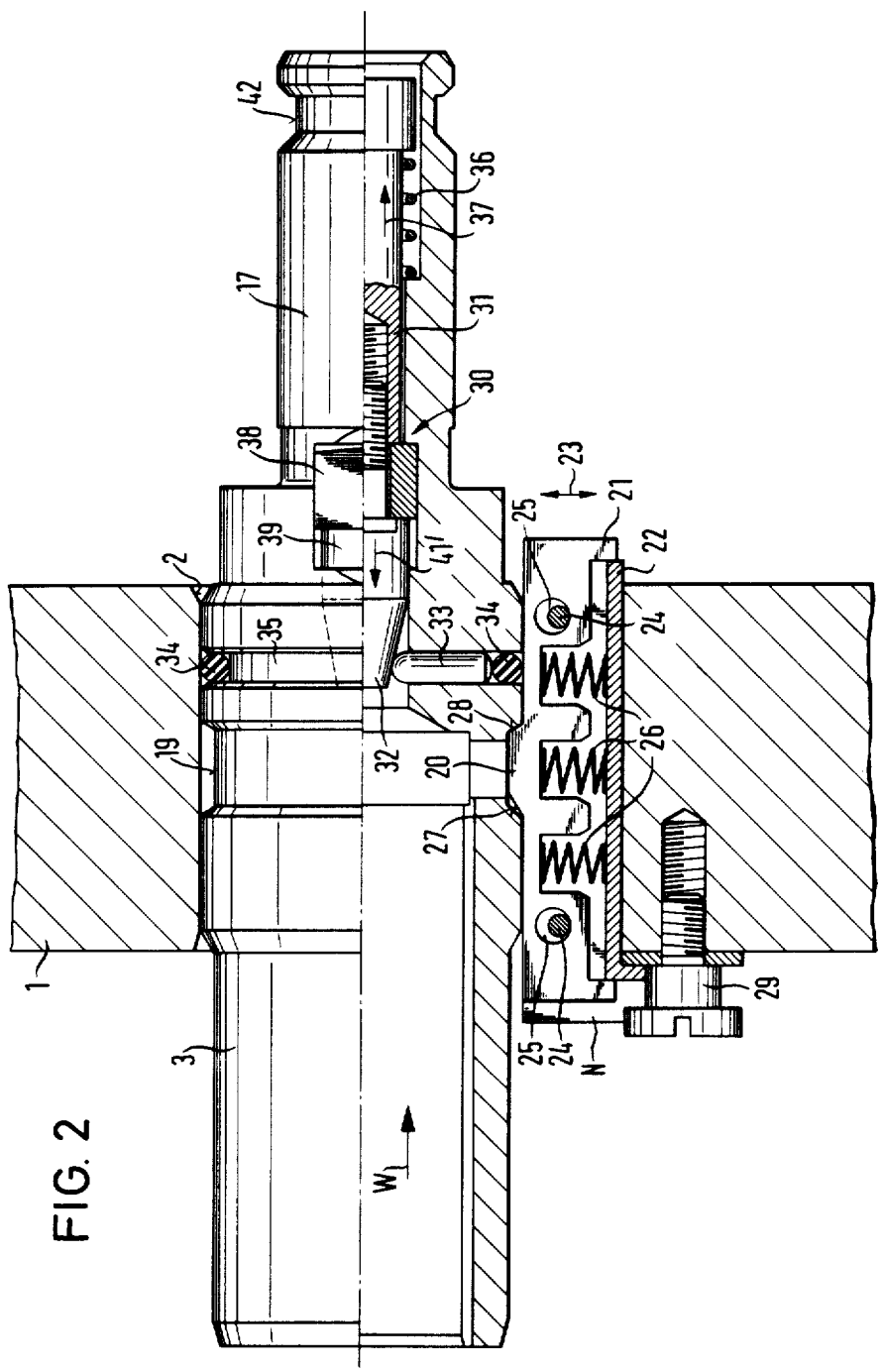
FIG. 2 shows a detail of the FIG. 1 on an enlarged scale.

In the preferred embodiment shown in FIGS. 1 and 2, the tool holder has in each case an annular groove 19 between the shaft and the part of the tool holder which serves to receive the tools 4 and 7.

This annular groove 19 interacts with a holding cam 20 which, as seen in FIG. 2, is arranged on the top of a bar 21, which is guided in an insert 22 so that it can be moved up and down in the direction of arrow 23. The movement of the bar 21 is limited by the pins 24 in the insert 22, which projects through the apertures 25 of the bar 21.

In the embodiment according to FIG. 2 the bar 21 is biassed by three springs 26 mounted in the insert 22 to push the holding cam 20 into the annular groove 19 of the tool holder.

The holding cam 20 has in relation to the exchange direction W on its front side a lifting slope 27 and on its rear side a locking surface 28.

The angle of the sidewalls of the annular groove 19 of the tool holder and the angle of the lifting slope 27 as well as of the locking surface 28 of the holding cam 20 are chosen so that movement of the tool holder through the aperture in tool carrier 1 in the exchange direction W is possible, but is blocked in the opposite direction.

The insert 22 is arranged in a bore or passage of tool carrier 1, which extends substantially parallel to the aperture for the tool holder, and is close enough to it that only the resilient holding cam 20 in its extended state projects into the aperture for the tool holder. Securing of the insert 22 in this bore or passage of the tool carrier 1 is achieved by a screw 29. By this screw the insert 22 is also provided with a transfer lug N whose function will be described later. As can be seen in FIG. 1, an insert 22 is located not only in the area of the apertures 2, but also in the area of apertures 5. The difference is only that the insert 22 for the tool holder with the used tools 7 is arranged in its bore or passage in the tool carrier 1 so that the screw 29 including the transfer lug N and thus the front side of the holding cam 20 provided with the lifting slope 17 is arranged on the side of carrier 1 facing the spindles 14. In this way, an exchange direction W in the direction of the processing spindles 14 results for the tool holder 3 with the new tools 4, while the exchange direction W for the tool holder 6 charged with the used tools 7 is directed away from the processing spindles 14.

As can be seen in FIG. 2, the tool holder 3 is provided with a device 30, which blocks rotation of the tool holder in the respective aperture of the tool carrier in a certain condition. In the same way as tool holders 3, tool holders 5 are also provided with such a device.

In this embodiment the device 30 for blocking the rotation of the tool holder consists of a clamping device which comprises a plunger 31 movable back and forth within the shaft 17 in its axial direction, which plunger acts by means of an incline on clamping means which are supported force-locked on the interior of the aperture. The incline consists of a conical head 32 of plunger 31 in this embodiment, which plunger acts upon pressure elements in the form of pressure pins 33 which engage on the interior of an O-ring 34, which is disposed in an annular groove 35 of tool holder 3.

The plunger 31 is biassed by a pressure spring 36 in the direction of the arrow 37, and is connected with the engagement lugs 38 which are displaceable in the shaft of the tool carrier in its axial direction in a groove 39.

The engagement lugs 38 are matched in their dimensions with recesses which are arranged in the conventional way in the quick-change adapters 15 of the processing spindles 14, and which provide the form-locked connection between the tool holders and the processing spindles in the coupled state, as will be described below.

A tool exchanging operation using tool exchange apparatus according to FIGS. 1 and 2 now proceeds as follows:

As soon as machine processing is finished, the processing spindles 14 charged with the used tools are withdrawn by retraction of the spindle units 13. Then the tool carrier 1 is pivoted from its charging position (not shown) into the exchange position in front of the processing spindles, as described in the patent application No. P 32 42 439.6 already mentioned. At this stage the aperatures 5 in the tool carrier 1 are empty whereas in apertures 2 the tool holders 3 charged with the new tools 4 are already present. Tool carrier 1 is then moved with the empty apertures 5 over the used tools 7 coupled with the processing spindles 14, until the resilient holding cam 20 comes to rest close to the annular groove 19 of the tool holder 6. In the last phase of this movement, the transfer lug N has pushed back the front 41 of the actuating sleeve 16 of the quick-change adapter 15 and has thus detached a ball-lock (not shown) in the quick-change adapter 15. The ejector in the quick-change adapter can then operate, whereby the tool holder 6 is moved out by a certain amount in the direction of arrow W, until the resilient holding cam 20 locks in annular groove 19 so that the tool holder 6 with the used tool 7 is safely held in the aperture 5 of the tool carrier 1. Since, as was described above, due to the locking with the resilient holding cam 20, the tool holder 6 can no longer be withdrawn in a direction opposite to the exchange direction W out of the tool carrier 1, it is only necessary to retract the spindle unit 13 from the tool carrier 1 in order thereby to withdraw the tool holders 6 from the quick-change adapters 15 of the processing spindles 14.

The exact alignment of the aperture 5 of the tool carrier 1 in the removal process described above was achieved by the guide rods 12, which during this process project into the guide bushings 11.

By the retraction of the spindle unit 13, the guide rods 12 cease to engage the guide bushings 11, so that the tool carrier 1 can be lowered into the position shown in FIG. 1. In this position the spindle unit 13 is again moved in the direction of the tool carrier 1, causing the guide rods 12 to engage in the guide bushings 10 and in this way the axes of the processing spindles 14 are exactly aligned with the axes of the tool holders 3 carrying the new tools 4. The spindle unit 13 can then be driven further in the direction of tool carrier 1 so that the quick-change adapters 15 are pushed over the shafts 17 of the tool holder 3. This loading process, in which the processing spindles rotate at low rpm, is then continued until the front surfaces 40 of the quick-change adapters 15 come into contact with the engagement lugs 38 of tool holder 3. From then onwards, there are three possible courses for the coupling process:

1. The front surfaces 40 impact on the engagement lug 38 and slide along their sides during the further loading process. The engagement lug 38 is moved against the force of the spring 36 in the groove 39 in the direction of the tool carrier 1, since the tool holder 3 as a whole, because of the effect of the locking face 28 of the holding cam 20, cannot be pressed out of the aperture 2 of tool carrier 1. Due to this sliding along of the frontal surfaces 40 on the engagement lug 38, the tool holder 3 begins to rotate in the aperture 2, so that the sliding process of engagement lug 38 on the frontal surface 40 of the quick-change adapter 15 is interrupted. Because of the displacement of the engagement lug 38 however, the plunger 31 and thus its conical head 32 are moved in the direction of the arrow 41, whereby the pressure pins 33 are moved radially outward and the O-ring 34 is pressed onto the inner face of the aperture 2. Because of the friction caused thereby, rotation of the tool holder 3 in the aperture 2 is prevented, so that the frontal surface 40 of the quick-change adapter 15 slides further over the side of the engagement lug 38, until the latter locks into the recess of the frontal surface 40, and the form-locked connection between the quick-change adapter 15 and the tool holder is established. In this locking process of engagement lug 38 in the recess of the quick-change adapter 15, the spring 36 moves the plunger 31 and thus its connected conical head 32 again into the initial position shown in FIG. 2, so that the pressure pins 33 can escape radially inward and the O-ring 34 can retreat. Thereby the blocking effect is removed so that the tool holder 3 can again rotate unimpeded in the aperture 2 of the tool carrier 1.

During the process above, the balls arranged within the quick-change adapter (not shown) engage the annular groove 42 on the free end of the shaft 17 of tool holder 3, so that the full connection between the working spindles 14 and the tool holder 3 with the new tools is established.

2. The frictional conditions between the sides of the engagement lug 38 and frontal surface 40 of the quick-change adapter 15 are such that the tool holder 3 either does not rotate or rotates only slightly in the aperture 2. In this case the engagement lugs 38 snap into the recesses of the quick-change adapter 15 after no more than half a rotation of the processing spindles, so that the device 30 described above for blocking the rotation of tool holder 2 in the apertures 2 of tool carrier 1 is not used. The final coupling of the tool holder 3 on the processing spindles 14 is then performed in the manner described above under 1.

3. The frontal surface 40 of the quick-change adapter 15 makes contact with the engagement lugs 38 at a time when the recesses in the frontal surfaces are aligned with the engagement lugs 38. In this rare case, the recesses at once engage the engagement lugs 38, so that here too the blocking device 30 for the rotation of the tool holder is not employed.

When the coupling process is ended, the spindle unit 13 is withdrawn against the tool carrier 1. Due to the effect of the lifting slope 27, the resilient holding cam 20 is pressed downward, so that it disengages from the annular groove 19 of the tool holder and the latter can be withdrawn in exchange direction W from the aperture 2 of the tool carrier 1. In the course of this withdrawal, the guide rods 12 also disengage from guide bushings 10, so that the tool carrier 1 can be swung back from its exchange position into the charging position (not shown) in which the tool holders 6 located in the apertures 5 with the used tools 7 are removed, and the now empty apertures 2 can be charged with the new tool holders 3 bearing the new tools 4.

Figure 4:
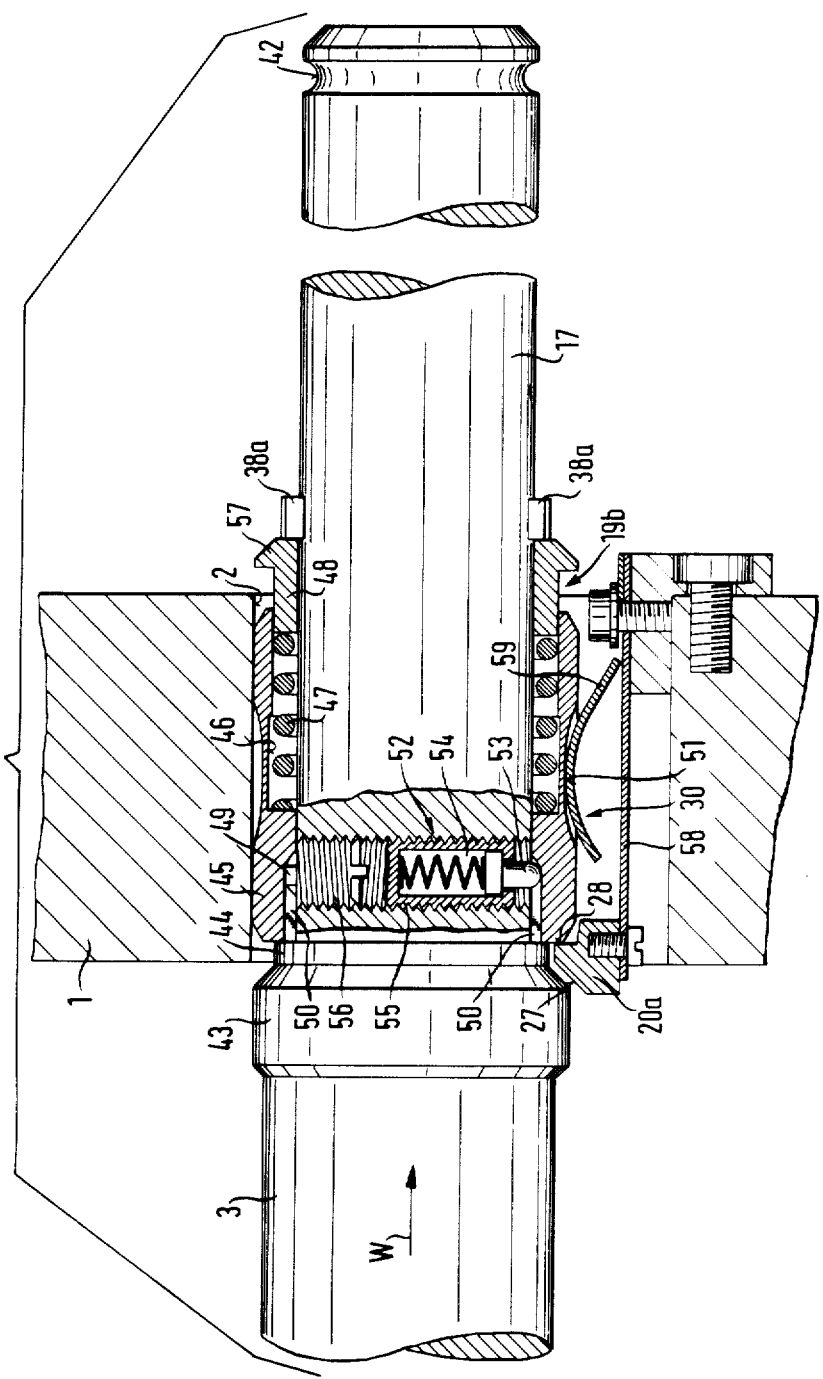
FIGS. 4 and 5 show respective details of the embodiment according to FIG. 3 on an enlarged scale.
Figure 5:
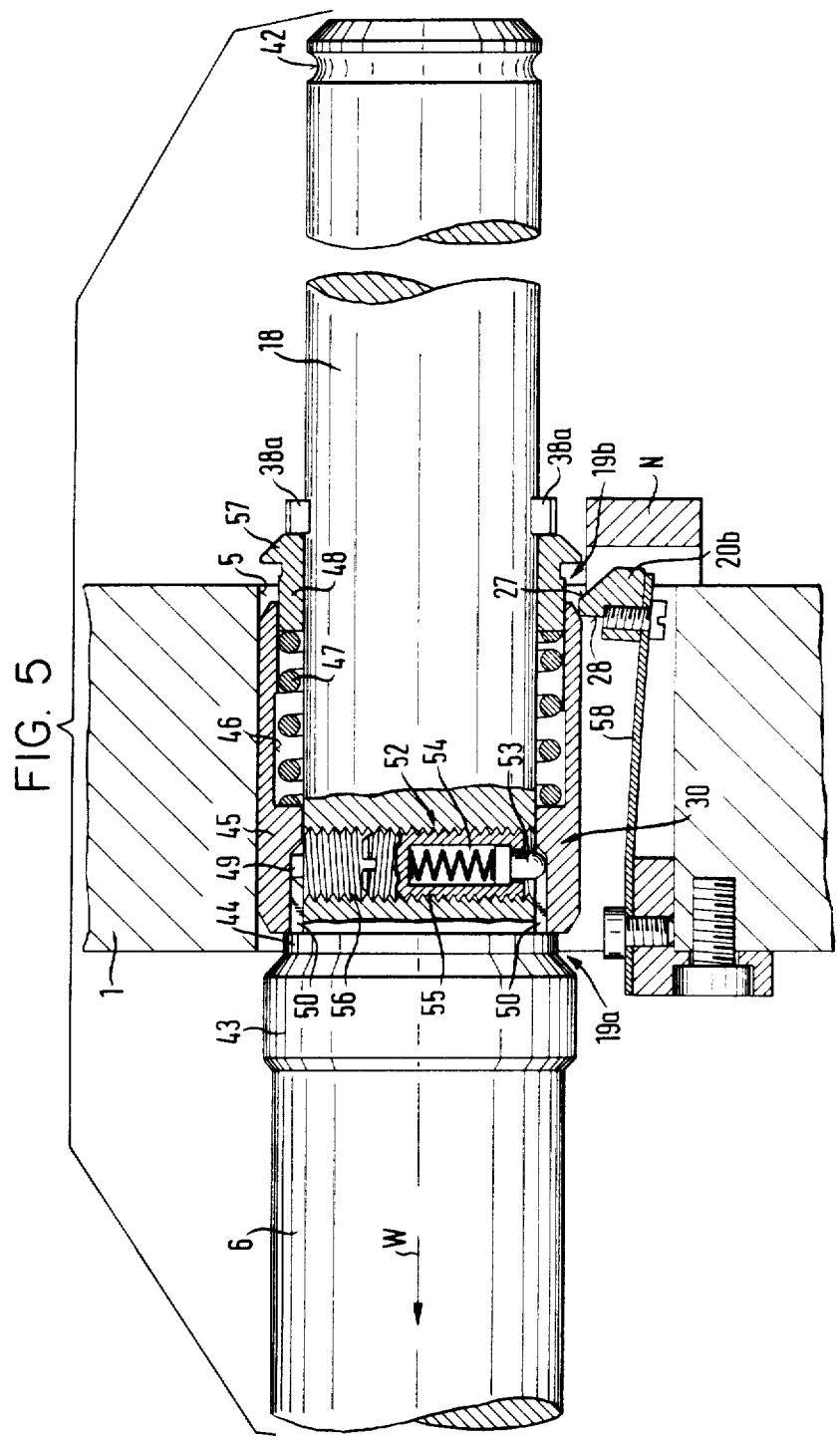

In the embodiment shown in FIGS. 3 to 5, the tool holders have a collar 43, the sides of which are formed as rising inclines. A cut-away recess 44 adjoins the collar 43 on the side facing the shaft 17 or 18, and a bushing 45 abuts this recess 44 at the frontal surface of said bushing. The bushing 45 has on its inside a cut-away step 46, in which a pressure spring 47 surrounding the shaft 17 or 18 is disposed, while said spring 47 is supported by its end remote from the collar 43 on a spring seat 48, which in turn abuts at its other face the engagement lugs 38 which are firmly connected with the shaft 38a.

The bushing 45 is displaceable on the shaft of the tool holder against the force of the spring in the direction of spring seat 48. On its inside, it has an annular groove 49, to which in the present embodiment four longitudinal grooves respectively offset from one another by 90° are connected.

On its exterior the bushing 45 has further recesses 51, the object of which will be explained later.

Within shaft 17 or 18, there is a catch 52. It consists of a ball end 53 which is mounted spring-loaded in a bore 54 of the sleeve 55, which is screwed in by an external thread into an internal thread of a bore 56 transversely arranged through the shaft.

In the normal case, the ball end 53 rests in the annular groove 49 of the bushing 45, so that the bushing 45 can rotate freely on shaft 17 or 18 of tool holder 3 or 6.

In the embodiment shown in FIGS. 3 to 5, each tool holder has a total of two spaced annular grooves 19a and 19b. As can be seen in FIGS. 4 and 5, the annular groove 19a on the one hand is formed by collar 43 of the tool holder and on the other hand by the frontal surface facing it of the bushing 45.

Annular groove 19b in turn is formed by the opposite face of the bushing 45 as well as by the collar 57 of the spring seat 48.

As shown in FIGS. 4 and 5, the annular grooves 19a and 19b are engaged by the holding cams 20a and 20b, which—as in the embodiment of FIGS. 1 and 2—are each provided with a lifting slope 27 on their fronts and with a locking face 28 on their rears.

The holding cams 20a and 20b are each secured at the free end of a spring tongue 58 whose other end is firmly connected with the tool carrier 1.

As in the first embodiment, the apertures are also formed in this embodiment by bores through the tool carrier 1. The holding cams 20a and 20b including their spring tongues 58 and their securing means are in turn mounted in passages, which are essentially parallel to the bores in the plate-type tool carrier 1 and open in their rim area into the bores, so that the top ends of the holding cams 20a and 20b project into the free cross-section of the apertures 2 and 5 designed as bores of the tool carrier 1.

In the case of aperture 2 carrying the tool holder 3 with the new tools 4, the resilient holding cam 20a is placed so that it engages in annular groove 19a, to the extent that the bushing 45 of tool holder 3 is in its correct place in the aperture 2. In this position of the bushing, a resilient peripheral catch 59 is supported on the outer surface of the bushing 45, which engages in the recess 51 of the bushing, to the extent that the latter rotates against the peripheral catch 59.

In the case of the aperture 5 bearing the tool holder 6 with the used tools 7, the resilient holding cam 20b is arranged so that it interacts with the annular groove 19b. In the area of resilient holding cam 20b there is also a transfer lug N on the side of the tool carrier 1 facing the processing spindles 14, with the object already described with respect to the first embodiment.

In principle, the tool exchange process proceeds for the embodiment shown in FIGS. 3 to 5 as in the case of the embodiment shown in FIGS. 1 and 2. To avoid repetition therefore, in the following only those functions are described which differ from the embodiment of FIGS. 1 and 2.

If the tool holders 6 with the used tools 7 are to be replaced, as described above they are slid into the apertures 5 of the tool carrier 1 until they adopt the position shown in FIG. 5. In this position, the resilient holding cam 20b is supported on the incline of the annular groove 19b. If now the ejector in the quick-change adapter is actuated by the effect of the transfer lug N on the actuating sleeve 16, the tool holder 6 is ejected, so that the resilient peripheral cam 20b comes to rest in the annular groove 19b. This holds the tool holder 6 firmly in tool carrier 1. If the spindle unit 13 is then withdrawn, the resilient holding cam 20b prevents the tool holder 6 from being withdrawn from the tool support against the tool exchange direction W.

If now the empty processing spindles 14 are to be charged with a new tool holder 3, the spindle unit 13—as described above—moves in the direction of tool carrier 1, until the frontal face 40 of the quick-change adapter 15 abuts the engagement lug 38a. Since the latter in this embodiment is firmly connected with the shaft of the tool holder, tool holder 3 is pushed against the exchange direction W by a certain distance through the aperture 2. But since in this process the resilient holding cam 20a, by means of its locking face 28, prevents the bushing from moving in the aperture 2, the ball end 53 is moved by the catch 52 out of the annular groove 49 on the inside of the bushing 45 and displaced to the area of the longitudinal grooves 50. To the extent that in this process these grooves are on the level of the ball end 53, it slides only out of the annular groove 49 into the respective longitudinal groove 50.

If now the tool holder 3 is carried along by the frontal face 40 sliding over the engagement lug 38a on the quick-change adapter 15, the catch 52 with its ball end 53 takes the bushing with it, rotating it in the aperture 2. This rotary motion of the bushing 45 is blocked as soon as the resilient peripheral catch 59 engages in the recess 51 on the exterior of the bushing 45. Since shaft 17 of tool holder 3 is connected fixedly by the catch 53 in this phase with the bushing 45, co-rotation of the engagement lug 38a is blocked so that the frontal face 40 of the quick-change adapter 15 again slides along the sides of the engagement lugs 38 until they latch with their recesses into the engagement lugs 38a. In this latching process, the ball head 53 slides back from the area of the longitudinal groove 50 again into the annular groove 49, so that the shaft 17 can again rotate freely in the bushing 45.

As already described in connection with the first embodiment, the frictional conditions between the aperture 2, the bushing 45 and the shaft 17 can be arranged so that the engagement lugs 38a are not moved during the sliding along the frontal face 40 of the quick-change adapter 15. In this case the device described above for the blocking of the rotational movement of the tool holder 3 in the aperture 2 does not operate.

I claim:

1. Tool exchanging apparatus for a machine tool having a processing spindle, which has a quick-change adapter for receiving a tool holder, comprising: a tool holder; a tool carrier having an aperture for the receipt of the tool holder, means for moving said tool carrier from a tool charging position into a tool exchange position; means for moving the tool holder through the aperture of the tool carrier in a first direction; means for holding the tool holder, at least in its decoupling or coupling position, in said aperture in a manner such that movement in a second direction opposite to the first direction is blocked; biassing means; at least one engagement lug carried by said tool holder and which can be retracted by a limited distance relative to the tool carrier in said second direction against said biassing means; means for preventing rotary movement of said tool holder in said aperture of the tool carrier when the engagement lug is retracted; and means that enable the means for preventing rotary movement to be responsive to retraction of the engagement lug.

2. Tool exchanging apparatus according to claim 1 wherein there is provided a plurality of tool holders and a corresponding plurality of apertures in said tool carrier.

3. Tool exchanging apparatus according to claim 1 wherein notching means is provided to hold said tool holder in the decoupling or coupling position in said aperture as well as to block sliding motion in said second direction.

4. Tool exchanging apparatus according to claim 3 wherein said notching means comprises at least one holding cam resiliently connected with the tool carrier and engaging in an annular groove on the associated tool holder.

5. Tool exchanging apparatus according to claim 4 wherein said holding cam has a lifting slope on its side facing said first direction and a locking face on its opposite side.

6. Tool exchanging apparatus according to claim 5 wherein said at least one holding cam is arranged in an insert which is secured in a recess adjacent said aperture in said tool carrier.

7. Tool exchanging apparatus according to claim 6 wherein said insert is securable in said recess so that said locking face faces away from the processing spindles.

8. Tool exchanging apparatus according to claims 2 and 3 wherein each said tool holder has an annular groove, said apertures of the tool carrier each have a holding cam, and all holding cams lie in one plane.

9. Tool exchanging apparatus according to claim 2 wherein each tool holder has two annular grooves closely spaced from each other, and said apertures have first holding cams in a first plane for tool holders charged with the new tools and second holding cams in a second plane for tool holders charged with used tools.

10. Tool exchanging apparatus according to claim 1 wherein said means for blocking the rotation of said tool holder consists of clamping means arranged within a shaft which is force-locked or form-locked on the tool carrier.

11. Tool exchanging apparatus according to claim 10 wherein said at least one engagement lug is mounted in a shaft of the tool holder for limited axial displacement in said second direction, and is operatively connected with said clamping means.

12. Tool exchanging apparatus according to claim 10 wherein said clamping means comprises a plunger connected with said at least one engagement lug and movable back and forth within said shaft in its axial direction, said plunger being operable by an incline on the clamping means which is locked on the inner surface of said aperture.

13. Tool exchanging apparatus according to claim 12 wherein the clamping means consists of an O-ring countersunk in an annular groove on the outside of the tool holder, which O-ring can be biassed by one or more pressing elements connected with the incline on the inner surface of said aperture.

14. Tool exchanging apparatus according to claim 13 wherein the incline is formed by a conical head of the plunger and the pressing elements are formed as pins.

15. Tool exchanging apparatus according to claim 1 wherein said means for blocking rotation of the tool holder consists of a bushing rotatably mounted on the shaft of the tool carrier which is fixed so as to be non-rotatable relative to the tool carrier which is also connectable for common rotation with the shaft by means of a catch arranged on said shaft.

16. Tool exchanging apparatus according to claim 15 wherein said at least one engagement lug is firmly connected with the tool holder and the bushing is mounted to move for limited retraction of said at least one engagement lug in said second direction on the shaft against a biassing means in the axial direction of the shaft.

17. Tool exchanging apparatus according to claim 16 wherein the bushing has an annular groove on its inner surface, as well as at least one longitudinal groove perpendicular thereto.

18. Tool exchanging apparatus according to claim 17 wherein, by displacement of the bushing, the catch on the shaft for the fixed coupling of the shaft on the bushing can be removed from the annular groove and is displaceable in the region of the longitudinal groove.

19. Tool exchanging apparatus according to claim 15 wherein for non-rotatable positioning of the bushing on the tool carrier, a peripheral catch is resiliently secured on the tool carrier, which catch engages in the recesses on the outside of the bushing.

20. Tool exchanging apparatus according to claim 17 wherein said biassing means is a pressure spring which surrounds the shaft, and the bushing has on its inner surface a cut-away portion for the acceptance of said pressure spring.

21. Tool exchanging apparatus according to claim 20 wherein a spring seat projects into the annular space formed by the cut-away portion, a front face of said seat supporting the pressure spring and another front face abutting the tool holder.

22. Tool exchanging apparatus according to claim 9 wherein one annular groove is formed by one front face of the bushing and a collar of the tool holder and the other annular groove is formed by the other front face of the bushing and a collar.

23. Tool exchanging apparatus according to claim 1 wherein the tool carrier is a plate and said aperture is formed by a bore in said plate, the axis of which bore is substantially perpendicular to major surfaces of the plate.

24. Tool exchanging apparatus according to claim 6 wherein recesses for the inserts bearing the resilient holding cams are each formed by a passage which extends substantially parallel to the bore in said plate, and are arranged near the latter so that they open at their periphery into the bore in said plate.

25. Tool exchanging apparatus according to claim 1 wherein on the tool carrier on the side facing the processing spindles and adjacent the aperture for the tool holder charged with used tools, transfer lugs are arranged, by means of which actuating sleeves of the quick-change adapters can be retracted to initiate the ejection process.

* * * * *